Sept. 18, 1962　　　D. E. VARNER　　　3,054,310
CONTROL SYSTEM
Filed May 21, 1959
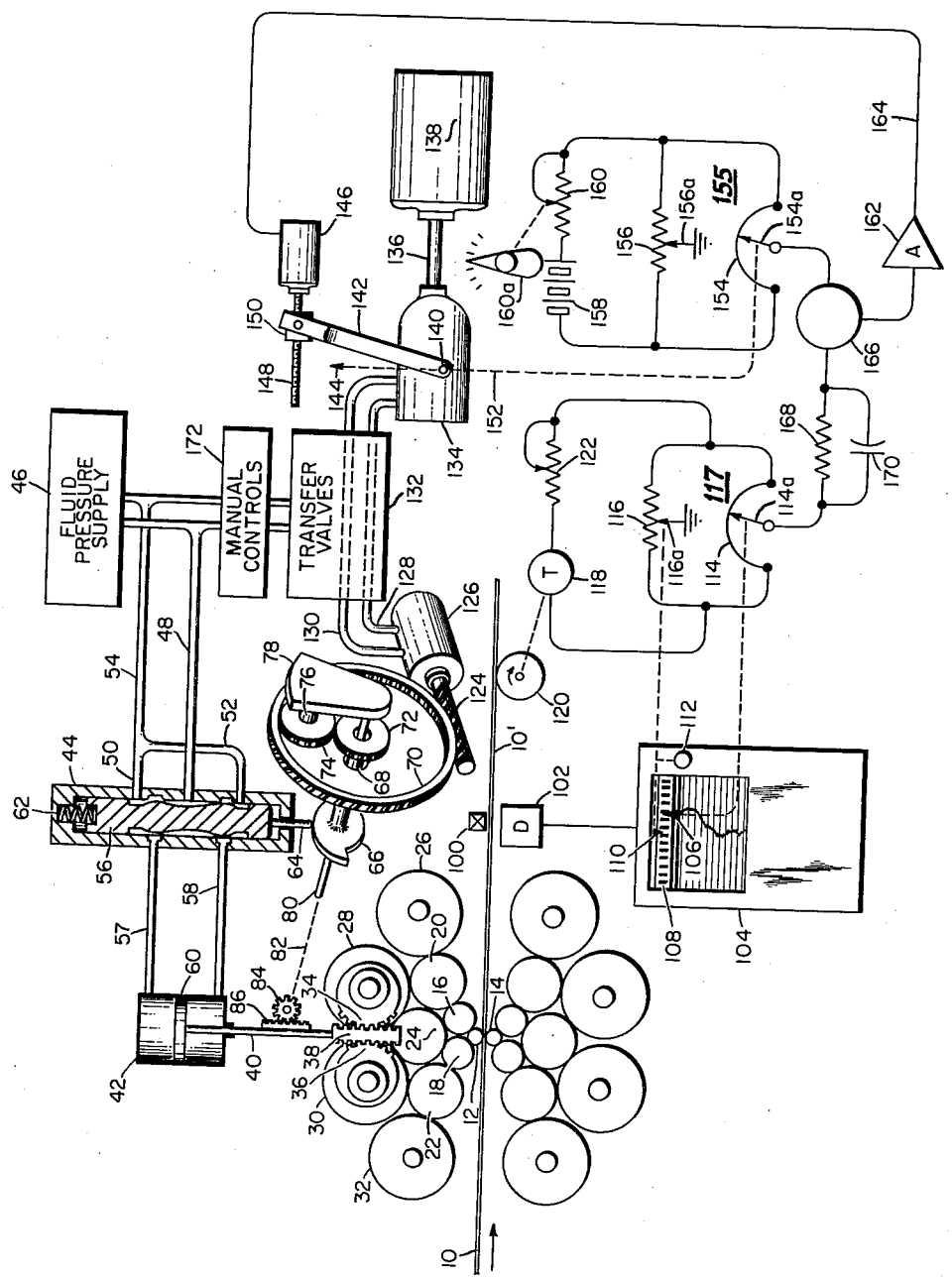
Inventor
Donald E. Varner
By Anthony D. Cennamo

United States Patent Office 3,054,310
Patented Sept. 18, 1962

3,054,310
CONTROL SYSTEM
Donald E. Varner, Columbus, Ohio, assignor to Industrial Nucleonics Corporation, a corporation of Ohio
Filed May 21, 1959, Ser. No. 814,843
6 Claims. (Cl. 80—56)

This invention relates to continuous automatic screwdown controls for strip rolling mills and like apparatus, and more specifically it relates to a novel electro-hydraulic integrating type controller particularly adapted for mills having hydraulically actuated screwdown mechanism.

The invention will be described and illustrated in combination with a cluster mill of the type which is referred to as a Sendzimir mill, this exemplary embodiment having for its purpose the production of rolled metal strip of a constant thickness at any desired value.

A mill of the illustrative type comprises a pair of small diameter work rolls buttressed by opposed clusters of larger back-up rolls. The screwdown adjustments controlling the spacing of the work rolls are effected by changing the angular positions of eccentric bearings which support the back-up rolls. To this end a hydraulic piston and cylinder type actuator applies a variable pressure through the piston rod thereof, which carries a double-faced rack gear in mesh with a pair of pinion sectors which rotate with the eccentric bearings supporting the back-up rolls. The pressure applied to the piston is automatically controlled by a hydraulic servomechanism having a control input position setting device and means providing inverse feedback of the actuator position so as to maintain the latter substantially constant for a given input position.

In accordance with this invention, the input position setting device of the hydraulic servo is automatically adjusted to substantially eliminate errors in the output strip thickness by means of the novel integrating computer-actuator of the control system herein described. More specifically, the output strip thickness is measured by an accurate gauging device and the measured thickness is electrically compared with a desired thickness to obtain an electrical error signal voltage which is functional of the thickness deviation of the strip. The error voltage provides the input to an electro-hydraulic integrator having an output shaft which rotates through an angle proportional to the time integral of the error voltage. The angular setting of the output shaft in turn provides the control input to the mill screwdown servomechanism.

The integrator preferably comprises a constant speed motor, a variable displacement hydraulic pump driven by the motor, and a hydraulic motor which is driven in turn by the fluid flow provided by the hydraulic pump. The displacement of the hydraulic pump, that is, the volume of fluid flow per unit time provided thereby, is controlled by a linear electro-mechanical servomechanism which receives the thickness error signal voltage and maintains the hydraulic pump displacement proportional thereto. Basically, the device of the present invention functions as follows:

The thickness of the output strip is measured and indicated by an accurate gauge. The gauge indication is electrically compared with a pre-set, desired thickness indication to develop a difference indication represented by an analog voltage $e$. The voltage is converted by the electro-mechanical servo to a proportional displacement of the hydraulic pump so that the fluid flow per unit time $$\left(\frac{dv}{dt}\right)$$

is related to the voltage $e$ by $$\frac{dv}{dt} = k_1 e \qquad (1)$$

wherein $k_1$ is a first constant. It is to be understood that the term "proportional" is used throughout this specification and the claims in the strict algebraic sense which describes a quantity having both direction and magnitude. Thus in the relation described by Equation 1, for example, it is understood that the fluid flow changes direction when the error voltage $e$ changes polarity or phase.

The total volume of fluid displaced in a given period of time $(t_2-t_1)$ is converted by the hydraulic motor to a proportional positioning of its output shaft, which rotates through an angle $\theta$ such that $$\theta = k_2 \int_{t_1}^{t_2} \frac{dv}{dt} = k_1 k_2 \int_{t_1}^{t_2} e \, dt \qquad (2)$$

The hydro-mechanical mill servo in turn converts the shaft angle to a proportional change in the screwdown position $\Delta S$ such that $$\Delta S = k_3 \theta \qquad (3)$$

Therefore the change in the screwdown position is proportional to the time integral of the error signal, that is $$\Delta S = k \int_{t_1}^{t_2} e \, dt \qquad (4)$$

In accordance with the preferred embodiment of the invention herein described and illustrated, it is found to be advantageous in practice to provide an error signal voltage $e$ which is proportional to the product of the strip thickness error and the linear speed of the output strip, that is $$e = c s_L (W_M - W_D) \qquad (5)$$

wherein $c$ is a constant, $s_L$ is the linear speed of the strip, $W_M$ is the measured thickness of the strip and $W_D$ is the desired thickness thereof. Thus there is provided a controller having automatically variable gain to compensate for variable transportation delay at different rolling speeds of the mill.

Provision is made also to permit manual adjustment of the constant $c$ by means of an operator's gain control. This makes available convenient and reproducible compensation of the controller characteristics for the many different thicknesses of several different metals which may be run on the same mill at various times.

It is the object of this invention to provide integral reset control for a rolling mill screwdown.

It is another object to provide automatic regulation of a mill screwdown adjustment as a function of the time integral of the error in strip thickness.

It is a further object to provide an automatic rolling mill screwdown control whereby the steady state error in strip thickness is always zero.

Other objects and advantages of the invention will become apparent in the following description given with reference to the accompanying drawing, in which:

The single FIGURE shows an illustrative rolling mill in combination with a control system in accordance with a preferred form of the invention.

Referring now to the drawing, there is shown a metal strip 10 undergoing reduction between a pair of small diameter work rolls 12 and 14. Each of the work rolls is buttressed by a plurality of increasingly larger rolls including a pair of first intermediate rolls as at 16 and 18, a pair of driven rolls as at 20 and 22 and a second intermediate roll as at 24. Rolls 20–24 are backed up by a set of eccentric bearing asemblises as at 26–32. A similar arrangement supports the bottom work roll 14.

Automatic screwdown control in accordance with this invention may be effected by regulating the angular position of eccentric bearing assemblies 28 and 30. To this end, corresponding opposed pinion sectors 34 and 36 are adapted for rotation energized by linear movement of a double-faced rack gear 38 connected to the piston rod 40 of a piston and cylinder type hydraulic actuator 42.

The fluid pressure applied to each of the two ends of the cylinder 42 is determined by the setting of a four-way valve 44. Valve 44 receives a continuous flow of fluid under pressure from a supply 46 thereof delivered by pressure line 48, and discharges fluid into branches 50 and 52 of a return pipe 54. The position of the spool 56 in valve 44 determines the portion of the total fluid pressure drop between lines 48 and 50 which is applied to the top end of cylinder 42 through a pipe 57. Similarly the spool position determines the portion of the total fluid pressure drop between lines 48 and 52 which is applied to the bottom end of the cylinder through pipe 58. When the spool 56 is effectively centered in the valve body 44, the pressure on the top side of piston 60 is essentially equal to the pressure on the bottom, and the piston rod 40 exerts no force in either direction. When the spool 56 is displaced from center, the pressure on one side of the piston 60 will increase and the pressure on the other side will decrease in linear relation to the amount of displacement of the spool.

The spool 56 is biased downwardly by a spring 62, thereby pressing an associated cam follower 64 against the periphery of a cam 66. Cam 66 is secured to a tubular shaft 68 which is journaled in the hub of a ring gear 70. A sun gear 72 is secured to the end of shaft 68, and a planetary gear 74 meshes with the sun gear and the ring gear 70. The planetary gear 74 is journaled on a stub shaft 76 which is secured to a sector arm 78. The sector arm is in turn secured to a shaft 80 which is journaled in the hollow cam shaft 68 and connected, as indicated by the dotted line 82, to a pinion gear 84 which meshes with a rack gear 86 secured to the piston rod 40 of the screwdown actuator.

The above described apparatus constitutes a servomechanism adapted to maintain a constant screwdown setting regardless of changes in the thickness, hardness, and/or tensioning of the strip 10 being fed through the work rolls 12 and 14 of the mill. Such changes of course tend to alter the separating force exerted between the work rolls. A change in the separating force is reflected through the intermediate rolls so as to upset the torque balance on the eccentric roll support bearings 28 and 30.

That is to say, the roll separating force produces a torque on the eccentric bearings which is balanced by the opposing torque exerted on pinion sectors 34 and 36 by the differential pressure on the piston 60 acting through the piston rod 40 and rack gear 38. Hence if the torque balance is upset by a change in the rolling pressure, it will tend to result in a movement of piston rod 40. However, a slight movement of the piston rod and gear rack 86 secured thereto will cause rotation of pinion 84, shaft 80 and sector 78, thus carrying the axis of planetary gear 74 around the sun gear 72. Since ring gear 70 is assumed to be held stationary, the sun gear 72 must rotate, thus altering the angular position of cam 66 which in turn changes the position of the spool 56 of the four-way valve 44. Hence if the change in mill forces tended to produce upward movement of the piston 60, the action of the four-way valve will increase the fluid pressure on the top of the piston and reduce the pressure on the bottom thereof, thus substantially restoring the piston to its original position.

It is apparent that the nominal gap between the work rolls can be reset by rotating the ring gear 70 to a new angular position, whereupon the follow-up action of the servo will cause the piston 60 to assume a new vertical position which will be automatically maintained as above described.

The effectiveness of the self-regulating action provided by the mill servo, however, is limited by several factors. As a position follower device, the hydraulic servo has a high gain when there is no load on the piston rod 40, but it is apparent that the gain decreases with increasing load on the piston, for the simple reason that the four-way valve spool must be displaced from center a greater amount in order to create a greater differential pressure on the piston. Moreover, changes in rolling pressure produce appreciable changes in the amount of "spring" or elastic stretching of the mill frame (not shown). The changes in the work roll opening allowed by the spring of the mill may not cause any rotation whatever of the feedback pinion 84, and hence go uncompensated. It is true also that if the entering strip 10 exhibits changes in elasticity, the thickness of the output strip 10' will vary even though the roll opening remains constant. Hence the hydraulic servo system requires resetting in accordance with continuous measurements of the output strip thickness.

Accordingly an accurate gauge, preferably a radioisotope thickness gauge such as is described in U.S. Patent No. 2,790,945, issued April 30, 1957, to Henry R. Chope, is installed on the strip output side of the mill. Such a gauge comprises a radiation source 100 and a detector 102 positioned on opposite sides of the strip 10', the detector 102 being connected to a continuous recording device 104 having a laterally movable, motor driven pointer 106 for indicating the instantaneous thickness of the strip 10' with reference to a calibrated scale 108. The recorder is also provided with a target indicator 110 which is adjustable by means of a knob 112 whereby the operator sets the desired strip thickness value into the controller.

The gauge indicator 106 is mechanically connected to the movable tap 114a of repeat slidewire 114, and the target indicator 110 is similarly connected to the movable tap 116a of a potentiometer 116. The potentiometer 116 and slidewire 114 constitute a bridge circuit 117 energized by a D.C. tachometer generator 118 which may be driven by an idler roll 120 in tractive engagement with the strip 10'. The tachometer output is connected across the bridge through a dropping rheostat 122.

The slidewire 114 and potentiometer 116 are mechanically and electrically matched so that when the pointers 106 and 110 are in alignment at any point on scale 108 the bridge circuit is balanced and taps 114a and 116a are at the same potential. However, assuming a constant voltage output from generator 118, if the gauge indicator 106 deviates from the desired thickness reading shown by the position of target pointer 110, a potential difference obtains between taps 116a and 114a which is proportional to the amount of the deviation. But, since the tachometer output is proportional to the rate of travel of the strip 10' it is seen that the potential between the taps is in fact proportional to the product of the deviation and the strip speed. Thus if tap 116a is grounded as shown, the potential of tap 114a with respect to ground provides an error voltage essentially as in Equation 5 hereinabove.

In order that the angular position of ring gear 70 may be reset as necessary in accordance with the time integral of the error voltage appearing at tap 114a, it is seen that the outer periphery of ring gear 70 has helically cut teeth which mesh with the worm shaft 124 of a hydraulic motor 126. The hydraulic motor is connected by inlet and outlet pipes 128 and 130 to a set of transfer valves indicated by box 132 which permit the screwdown setting to be adjusted either automatically or manually as explained hereinafter. In the automatic mode, the position of the transfer valves is such that pipes 128 and 130 are directly connected, as shown by the dotted lines passing through box 132, to a variable displacement hydraulic pump 134.

The motor 126 and pump 134 are commercial items of manufacture such as are available, for example, from Vickers Incorporated, Detroit, Michigan. The pump shaft 136 is continuously driven by a constant speed electric motor 138. The pump 134 is provided with a control shaft 140 to which is secured a control arm 142. When the arm 142 is located in a center position indicated at 144, the pump has zero displacement, and accordingly the hydraulic motor worm shaft 124 is at a standstill. If the arm 142 is moved from the center position in one direction, fluid is forced through the motor 126 from pipe 128 to pipe 130. If the arm 142 is moved from the center position in the opposite direction, the fluid flow is reversed, entering the motor through pipe 130 and returning to the pump 134 through pipe 128. The fluid flow causes rotation of the motor shaft in a direction determined by the direction of the fluid flow. The rate of rotation is determined by the volume of circulating fluid per unit time, which in turn is determined by the displacement of pump 134. The pump displacement is proportional to the distance the control arm 142 is moved from its center position 144.

The hydraulic pump displacement control arm 142 is automatically repositioned as necessary by an electro-mechanical servomechanism which includes an electric servo motor 146 for driving a screw shaft 148. The screw 148 carries a traveling nut 150 which is journaled in the bifurcated end-portion of the control arm 142. To provide an electrical analog of the position occupied by the control arm 142, the associated control shaft 140 of the hydraulic pump is mechanically connected as indicated by the dotted line 152 to the movable tap 154a of a slide-wire potentiometer 154.

Slidewire 154 is connected in a bridge circuit 155 with a potentiometer 156, the bridge being energized by a primary voltage source 158 which is connected through a rheostat 160. The mechanical connection 152 is made so that the slidewire arm 154a is in the center of its travel when the pump control arm 142 is in the center position 144. Potentiometer 156 is then adjusted to correct any slight mechanical-electrical misalignment, so that the bridge 155 is balanced and the voltage between slidewire tap 154a and potentiometer tap 156a is zero when the pump 134 operates with zero displacement.

As set out hereinabove, the error signal output of the comparator bridge 117 is shown to be taken with respect to ground, since potentiometer tap 116a is ground. Accordingly tap 156a of potentiometer 156 is likewise grounded, and the feedback voltage output of bridge circuit 155 appears at the slidewire tap 154a in the same manner that the error signal voltage output of bridge 117 appears at slidewire tap 114a. It is apparent that the bridge circuit 155 functions as a variable voltage source for providing a feedback signal proportional to the displacement of the pump.

The error voltage and the feedback voltage are connected in opposing relationship through a chopper comparator-modulator circuit which provides the input to a servo amplifier 162. The output of the servo amplifier is connected as indicated by line 164 to the servo motor 146. The chopper-amplifier-motor combination is of the conventional two-phase design in which the chopper modulator 166 acts as a directional detector of unbalance between the values of two opposed D.C. voltages. One input terminal of the chopper is connected to the variable tap 154a of the slidewire 154; the other input terminal is connected to the variable tap 114a of slidewire 114 through a parallel network comprising a resistor 168 and a capacitor 170. The resistance-capacitance network is designed to compensate the integrator for inertial delays, as will appear hereinafter.

For the purpose of summarizing the operation of the system, it is first assumed that the thickness of the output strip 10' has the correct value indicated by the setting of target indicator 110 with respect to scale 108. The gauge pointer 106 will accordingly indicate the same value, that is, both pointers will be in vertical alignment. The voltage outputs of bridge circuits 117 and 155 will both be zero, the servo motor 146 will be at rest, the control arm 142 of the hydraulic pump will be located in the center position 144, the pump 134 will have zero displacement, and hydraulic motor 126 will also be at rest, thus holding ring gear 70 in a fixed position. Accordingly the position of the screwdown actuator piston rod 40 remains relatively constant.

Now assuming, for example, that the input strip 10 exhibits a substantial change in thickness or hardness, the thickness of the output strip 10' will reflect such change as hereinabove explained, and a concomitant change in the amount of radiation incident on the detector 102 will cause the gauge pointer 106 to deviate from its alignment with target point 110. The upset of the balanced condition of bridge circuit 117 results in an error voltage at the tap 114a of repeat slidewire 114 which is proportional to the product of the thickness deviation and the speed of the output strip 10'. Accordingly the voltage at slidewire tap 114a will no longer be equal to the voltage at slidewire tap 154a and a current will flow through the circuit of chopper 166. This current flow is modulated by the chopper, whereby an alternating signal is presented to the input of servo amplifier 162. Thereupon the amplifier delivers an alternating voltage output having one of two directly opposite phases depending on the polarity of the signal input to the chopper, thus causing servo motor 146 to rotate in a direction such that the slidewire tap 154a will seek a new position wherein its potential is equal and opposite to the voltage at slidewire tap 114a.

Operation of the servo motor 146 displaces the nut 150 and pump control arm 142 so that fluid is forced through the hydraulic motor 126, thus rotating ring gear 70. Since the screw-down actuator piston 40 is assumed to be initially held stationary, gears 86 and 84, shaft 80 and sector arm 78 are also initially fixed; therefore rotation of ring gear 70 will cause rotation of sun gear 72 and cam 66, displacing spool 56 of the four-way valve 44. This causes the differential fluid pressure on the piston 60 to change, producing a movement of the screwdown mechanism which in turn is fed back through the servo gears to cam 66 and the four-way valve; the feedback will thus stabilize the screwdown position at a new setting dependent on the new position of ring gear 70, and the new setting is displaced from the old setting in a direcion such that the error in strip thickness is reduced.

As the strip thickness changes in a direction to reduce the error therein, the gauge pointer 106 will approach the position of the target pointer 110, and the error signal output of bridge 155 will be greater than the error signal, causing a current to flow through the chopper circuit in the opposite direction. The output of servo amplifier 162 will thereupon be reversed in phase, reversing the direction of rotation of the servo motor 146 so that the slidewire arm 154a will seek a point nearer ground potential and the hydraulic pump control arm 142 will approach the zero displacement position indicated at 144. As soon as the error in strip thickness has been reduced to zero, the hydraulic motor 126 will come to rest, leaving the ring gear 70 in a new angular position.

In accordance with the objects of the invention, the new position of the ring gear 70 should be displaced from the original position by an amount proportional to the time integral of the error signal voltage. This result would automatically obtain if there were no inertia or leakage in the hydraulic system, and if the electro-mechanical servo were always able to maintain the position of pump control arm 142 proportional to the instantaneous value of the error signal voltage. However, the usual inertial delays are present in both the servo and the hydraulic system, so that some delay compensation is usually necessary to minimize errors in the integration. Accordingly it is preferable to select a servo motor 146 and amplifier 162 combination wherein the motor speed is dependent on the amplitude of the signal applied to the amplifier input. This results in a much more versatile control system, in that the response characteristics of the servo can be readily modified to adapt the controller to different types of mills or different operating conditions by slight changes in the design of the RC compensating network, herein illustrated as a "forcing circuit" comprising resistor 168 and capacitor 170, through which the unbalance signal is connected to the amplifier input.

The rolling of different widths and thicknesses of various materials on the mill requires a controller operable with different integration coefficients, that is, a selectable gain, as pointed out hereinabove. Accordingly, rheostat 160 in the bridge circuit 155 is adapted to provide the machine operator with a readily accessible gain adjustment dial setting knob 160a. Rheostat 122 in bridge circuit 117 provides a coarse gain adjustment whereby rheostat dial 160a may be suitably calibrated on installation of the controller.

Although the motor 138 is essentially a constant speed motor as aforesaid, in cases where widely different thicknesses of strip are rolled at various times on the same mill it has been found necessary to provide some type of speed selector whereby the pump 134 may be driven at a constant, slow speed while rolling thin materials, or at a constant, fast speed while rolling thicker materials. Accordingly, the drive motor 138 may be of a variable speed type with a speed selector, or a selective gear transmission may be installed between the motor 138 and the pump 134.

Whenever the operator is required to perform the screwdown adjustment by manual means, the automatic-manual transfer valves represented by box 132 may be actuated to a manual position. In the manual position, the fluid flow provided by hydraulic pump 134 is by-passed around the same, and the hydraulic motor 126 is connected to the fluid pressure line 48 and return pipe 54 of the fluid pressure supply 46 through manual screw-down open and close valves represented by box 172. Thus in the manual mode, the motor 126 may be operated in either direction utilizing the fluid pressure supply which energizes the mill servo.

While the invention is herein shown and described as embodied in a specific device, such showing and description is meant to be illustrative only and not restrictive, since clearly a great many changes, modifications and outwardly quite different embodiments can be made without departing from the spirit and scope of the invention as is set forth in the appended claims.

What is claimed is:

1. In a control system for a strip rolling mill wherein a generated error signal representing the thickness deviation of the strip at the output of the mill is fed back to control the spacing between the work rolls of the mill, the improvement of means for computing a time integral of said signal and for adjusting said work roll spacing by an amount proportional to said integral, said computing and adjusting means comprising means for continuously translating the instantaneous value of said signal to a proportional fluid flow, a hydraulic motor having a movable member displaced by said fluid flow in proportion to the volume thereof, and actuator means for repositioning one of said work rolls in accordance with the displacement of said member.

2. The improved control system of claim 1 wherein said actuator means comprises a hydraulic piston and cylinder device, a supply of fluid under pressure, servo valve means connecting said cylinder and said supply, and a differential follower mechanism having two members for positioning said servo valve to control the pressure applied to said piston, one member of said mechanism being positioned by said motor member, and the other member being positioned by movement of said piston through a mechanical feedback connection thereto.

3. The improved control system of claim 1 wherein said translating means comprises means for providing a fluid flow to said motor, means for adjusting the direction and the rate of said flow, and electro-mechanical servomechanism means controlled by said error signal for positioning said fluid flow adjusting means.

4. The improved control system of claim 3 wherein said servomechanism comprises a variable voltage source, means for adjusting the output of said source, amplifier means having an input responsive to the difference between said error signal and said voltage source output, and a servo motor driven by the output of said amplifier for actuating both said fluid flow adjusting means and said voltage source output adjusting means.

5. In the combination of a rolling mill having a pair of spaced rolls for effecting the reduction of a strip, screw-down means for varying the spacing of said rolls to regulate the thickness of said strip and control apparatus responsive to measurements of the thickness of the strip for effecting automatic adjustment of said screwdown, the improvement wherein said control apparatus comprises means including gauging means positioned on the strip output side of said mill for generating an error signal voltage functional of any deviation in the thickness of said strip as measured by said gauging means, a hydraulic motor; means providing a controllable fluid flow for driving said motor including a hydraulic pump, means for driving said pump at a substantially constant speed, and mechanically variable means for controlling the displacement of said pump in accordance with one characteristic of said error signal voltage and for controlling the direction of said fluid flow in accordance with another characteristic thereof; electro-mechanical servomechanism means for actuating said mechanically variable means, said servomechanism receiving said voltage and maintaining the rate of said fluid flow proportional to the value thereof, a mechanical member displaced by operation of said motor in an amount proportional to the volume of said fluid flow, and actuator means for repositioning said screwdown in accordance with the displacement of said mechanical member.

6. In the combination of a rolling mill having a pair of spaced rolls for effecting the reduction of a strip, screwdown means for varying the spacing of said rolls to regulate the thickness of said strip and control apparatus responsive to measurements of the thickness of the strip for effecting automatic adjustment of said screwdown, the improvement wherein said control apparatus comprises means including gauging means positioned on the strip output side of said mill for generating an error signal voltage functional of any deviation in the thickness of said strip as measured by said gauging means, said error signal generating means comprising a tachometer generator driven in synchronism with the longitudinal movement of said strip, a balanceable network energized by the output of said generator, and means for unbalancing said network in an amount proportional to said thickness deviation, whereby said error signal will be proportional to the product of said deviation and the rate of production of said strip; a hydraulic motor, means providing a controllable fluid flow for driving said motor, electro-mechanical servomechanism means for receiving said voltage and for maintaining the rate of said fluid flow proportional to the value thereof, a mechanical member displaced by operation of said motor in an amount proportional to the volume of said fluid flow, and actuator means for repositioning said screwdown in accordance with the displacement of said mechanical member.

References Cited in the file of this patent

UNITED STATES PATENTS

| | | |
|---|---|---|
| 1,570,505 | Laughlin | Jan. 19, 1926 |
| 2,028,089 | Erling | Jan. 14, 1936 |
| 2,466,041 | Peoples et al. | Apr. 5, 1949 |
| 2,479,974 | Sendzimir et al. | Aug. 23, 1949 |
| 2,611,246 | Ackerman | Sept. 23, 1952 |
| 2,687,052 | Zeitlin | Aug. 24, 1954 |
| 2,851,911 | Hessenberg | Sept. 16, 1958 |
| 2,902,825 | Nitka et al. | Sept. 8, 1959 |
| 2,910,831 | Gatwood | Nov. 3, 1959 |

FOREIGN PATENTS

| | | |
|---|---|---|
| 647,606 | Great Britain | Dec. 20, 1950 |
| 794,506 | Great Britain | May 7, 1958 |